US012761415B2

(12) United States Patent
Chiao et al.

(10) Patent No.: US 12,761,415 B2
(45) Date of Patent: Oct. 13, 2026

(54) DISPLAY APPARATUS

(71) Applicant: HannStar Display Corporation, Taipei City (TW)

(72) Inventors: Yu-Chi Chiao, Taipei City (TW); Shih Wei Chen, Taipei City (TW); Chih-Yen Chen, Taipei City (TW); Chia-Lin Liu, Taipei City (TW); Chin-Hui Chen, Taipei City (TW)

(73) Assignee: HannStar Display Corporation, Taipei City (TW)

( * ) Notice: Subject to any disclaimer, the term of this patent is extended or adjusted under 35 U.S.C. 154(b) by 2 days.

(21) Appl. No.: 19/015,641

(22) Filed: Jan. 10, 2025

(65) Prior Publication Data

US 2025/0231335 A1 Jul. 17, 2025

(30) Foreign Application Priority Data

Jan. 12, 2024 (TW) ................................ 113101384

(51) Int. Cl.
*F21V 8/00* (2006.01)

(52) U.S. Cl.
CPC ................................. *G02B 6/0043* (2013.01)

(58) Field of Classification Search
CPC ............................ G02B 6/0036; G02B 6/0043
USPC ......................................................... 362/606
See application file for complete search history.

(56) References Cited

U.S. PATENT DOCUMENTS

| | | | | |
|---|---|---|---|---|
| 2013/0257880 A1* | 10/2013 | Li | G02B 6/0035 | 362/613 |
| 2015/0338565 A1* | 11/2015 | Pao | G02B 6/0036 | 362/606 |
| 2020/0233142 A1* | 7/2020 | Liao | G02B 6/0068 | |
| 2021/0373225 A1* | 12/2021 | Yao | G02B 6/0055 | |

FOREIGN PATENT DOCUMENTS

| | | |
|---|---|---|
| CN | 218824783 | 4/2023 |
| CN | 218824783 U * | 4/2023 |
| TW | 201333560 | 8/2013 |
| TW | M637345 | 2/2023 |

OTHER PUBLICATIONS

Machine translation of CN-218824783-U (Apr. 7, 2023) (Year: 2023).*

* cited by examiner

*Primary Examiner* — Abdulmajeed Aziz
(74) *Attorney, Agent, or Firm* — JCIPRNET

(57) ABSTRACT

A display apparatus including a reflective display panel, a light guide plate, a first light source and a plurality of optical microstructures is provided. The light guide plate is disposed on one side of a display surface of the reflective display panel and has a first surface facing the display surface and a first light incident surface connected to the first surface. The first light source is disposed on one side of the first light incident surface of the light guide plate. The optical microstructures are disposed on a second surface of the light guide plate. Each of the plurality of optical microstructures has a plane parallel to the second surface. An included angle between an extension direction of each of the plurality of optical microstructures and the first light incident surface is greater than or equal to 45 degrees and less than or equal to 90 degrees.

9 Claims, 10 Drawing Sheets

DISPLAY APPARATUS

CROSS-REFERENCE TO RELATED APPLICATION

This application claims the priority benefit of Taiwan application serial no. 113101384, filed on Jan. 12, 2024. The entirety of the above-mentioned patent application is hereby incorporated by reference herein and made a part of this specification.

BACKGROUND

Technical Field

The disclosure relates to a display apparatus, and in particular, to a display apparatus having a light guide plate.

Description of Related Art

Reflective display panels primarily use ambient light as their light source. Since they can display without backlighting, they exhibit excellent energy-saving characteristics. As a result, they are often used in outdoor or well-lit environments, such as advertising boards, electronic labels, and sports watches, etc.

To meet usage requirements in conditions with insufficient ambient light, a solution incorporating a front light module on the display side of the reflective display panel has been proposed. However, the mesh dot designs used in a light guide plate of such type of front light module to reflect the light beam are typically arc-shaped or cone-shaped. Although the light emission uniformity of the light guide plate can be improved by adjusting the size and density distribution of the dots, uneven light distribution near the light entry side, caused by the light source distribution, remains an issue.

SUMMARY

The disclosure provides a display apparatus whose light guide plate has better light emission uniformity.

A display apparatus of the disclosure includes a reflective display panel, a light guide plate, a first light source and a plurality of optical microstructures. The reflective display panel has a display surface. The light guide plate is disposed on one side of the display surface of the reflective display panel and has a first light incident surface and a first surface connected to each other. The first surface faces the display surface of the reflective display panel. The first light source is disposed on one side of the first light incident surface of the light guide plate and is configured to emit a plurality of first light beams toward the first light incident surface of the light guide plate. The plurality of optical microstructures are disposed on a second surface of the light guide plate. The second surface connects the first light incident surface and is opposite to the first surface. Each of the plurality of optical microstructures has a plane parallel to the second surface. An included angle between an extension direction of each of the plurality of optical microstructures and the first light incident surface of the light guide plate is greater than or equal to 45 degrees and less than or equal to 90 degrees.

In an embodiment of the disclosure, the extension direction of each of the plurality of optical microstructures of the display apparatus is perpendicular to the first light incident surface of the light guide plate.

In an embodiment of the disclosure, the included angle between the extension direction of each of the plurality of optical microstructures of the display apparatus and the first light incident surface of the light guide plate is less than 90 degrees.

In an embodiment of the disclosure, the plurality of optical microstructures of the display apparatus include a plurality of first optical microstructures and a plurality of second optical microstructures. Each of the plurality of second optical microstructures is located between the plurality of first optical microstructures and the first light incident surface. A first length of each of the plurality of first optical microstructures in the extension direction is greater than a second length of each of the plurality of second optical microstructures in the extension direction.

In an embodiment of the disclosure, the second length of each of the plurality of second optical microstructures of the display apparatus gradually decreases as it approaches the first light incident surface of the light guide plate.

In an embodiment of the disclosure, the plurality of optical microstructures of the display apparatus include a plurality of first optical microstructures and a plurality of second optical microstructures arranged along an arrangement direction. Each of the plurality of second optical microstructures is located between the plurality of first optical microstructures and the first light incident surface. Any two adjacent ones of the plurality of first optical microstructures arranged along the arrangement direction have a first spacing. Any two adjacent ones of the plurality of second optical microstructures arranged along the arrangement direction have a second spacing. The second spacing is greater than the first spacing.

In an embodiment of the disclosure, the plurality of optical microstructures of the display apparatus include a plurality of first optical microstructures and a plurality of second optical microstructures. The plurality of first optical microstructures and the plurality of second optical microstructures are alternately arranged along an arrangement direction. A first length of each of the plurality of first optical microstructures in the extension direction is greater than a second length of each of the plurality of second optical microstructures in the extension direction. The arrangement direction intersects the extension direction.

In an embodiment of the disclosure, the plane of each of the plurality of optical microstructures of the display apparatus is protruded from the second surface along a direction away from the first surface, or recessed from the second surface along a direction toward the first surface.

In an embodiment of the disclosure, the display apparatus further includes a second light source. The second light source is disposed on one side of a second light incident surface of the light guide plate, and is configured to emit a plurality of second light beams toward the second light incident surface of the light guide plate. The second light incident surface connects the first surface and the second surface and is opposite to the first light incident surface. The plurality of optical microstructures include a plurality of first optical microstructures, a plurality of second optical microstructures and a plurality of third optical microstructures. Each of the plurality of second optical microstructures is located between the plurality of first optical microstructures and the first light incident surface. Each of the plurality of third optical microstructures is located between the plurality of first optical microstructures and the second light incident surface. A first length of each of the plurality of first optical microstructures in the extension direction is greater than a second length of each of the plurality of second optical microstructures in the extension direction and a third length of each of the plurality of third optical microstructures in the extension direction.

In an embodiment of the disclosure, the plurality of optical microstructures of the display apparatus are arranged along an arrangement direction. Any two adjacent ones of the plurality of first optical microstructures arranged along the arrangement direction have a first spacing. Any two adjacent ones of the plurality of second optical microstructures arranged along the arrangement direction have a second spacing. Any two adjacent ones of the plurality of third optical microstructures arranged along the arrangement direction have a third spacing. The second spacing and the third spacing are greater than the first spacing.

Based on the above, in a display apparatus according to an embodiment of the disclosure, a light guide plate is provided on one side of a display surface of a reflective display panel, and a plurality of optical microstructures are provided on a surface of the light guide plate facing away from the reflective display panel. Since each optical microstructure has a plane substantially parallel to the surface on which it is installed, the light beam transmitted in the light guide plate may create a more uniform light emission distribution on a surface of the light guide plate facing the reflective display panel after being reflected by the plane of the optical microstructure, thereby improving the display quality of the display apparatus.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The aforementioned technical contents, features and effects of the present invention will be clearly presented in the following detailed description of a preferred embodiment with reference to the drawings. The directional terms used in the following embodiments, such as up, down, left, right, front, or rear, are for reference to the directions indicated in the accompanying drawings. Therefore, these directional terms are used for explanation purposes and not for limiting the scope of the invention.

Figure 1:
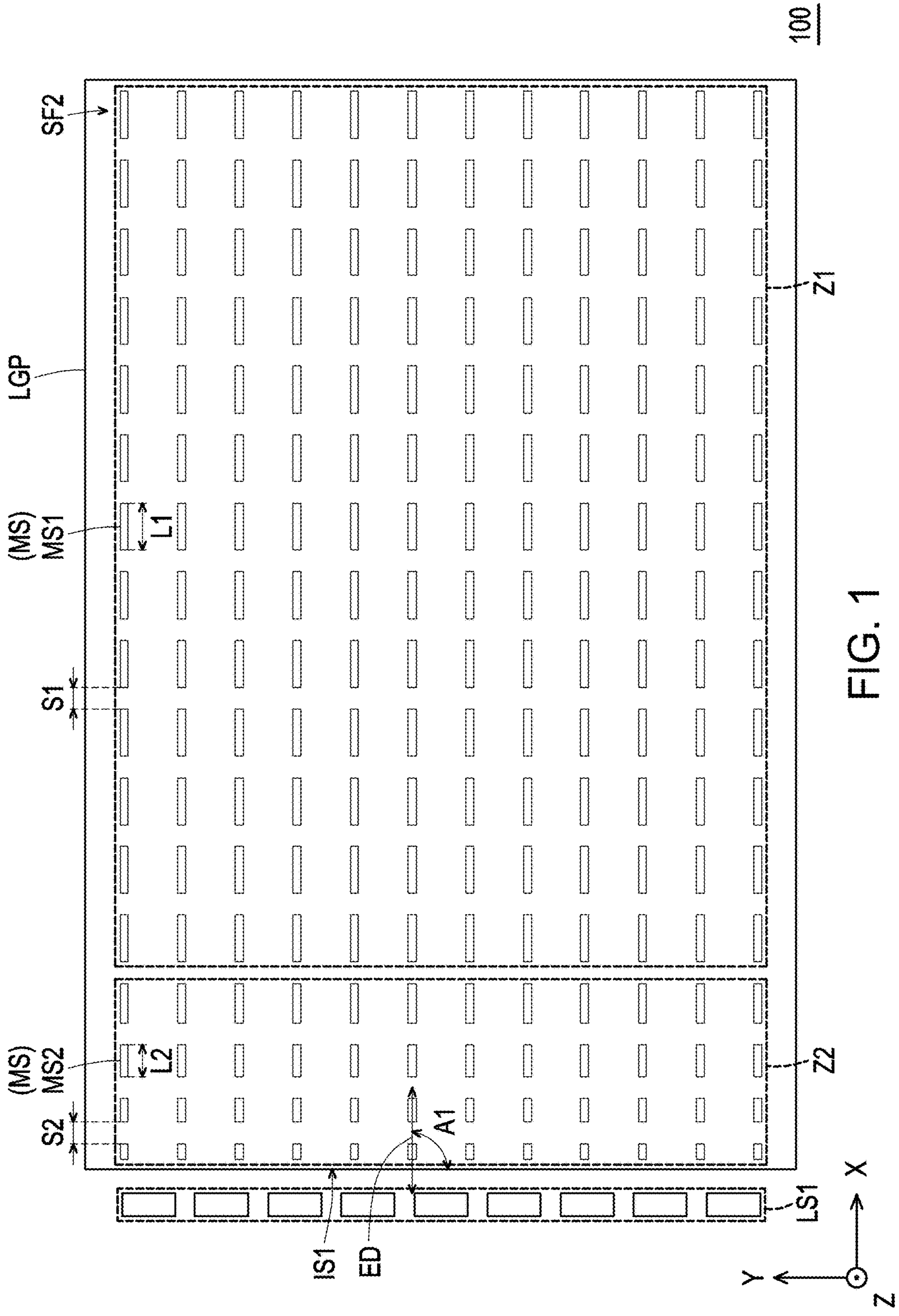
FIG. 1 is a schematic front view of a light source module according to a first embodiment of the disclosure.
Figure 2:
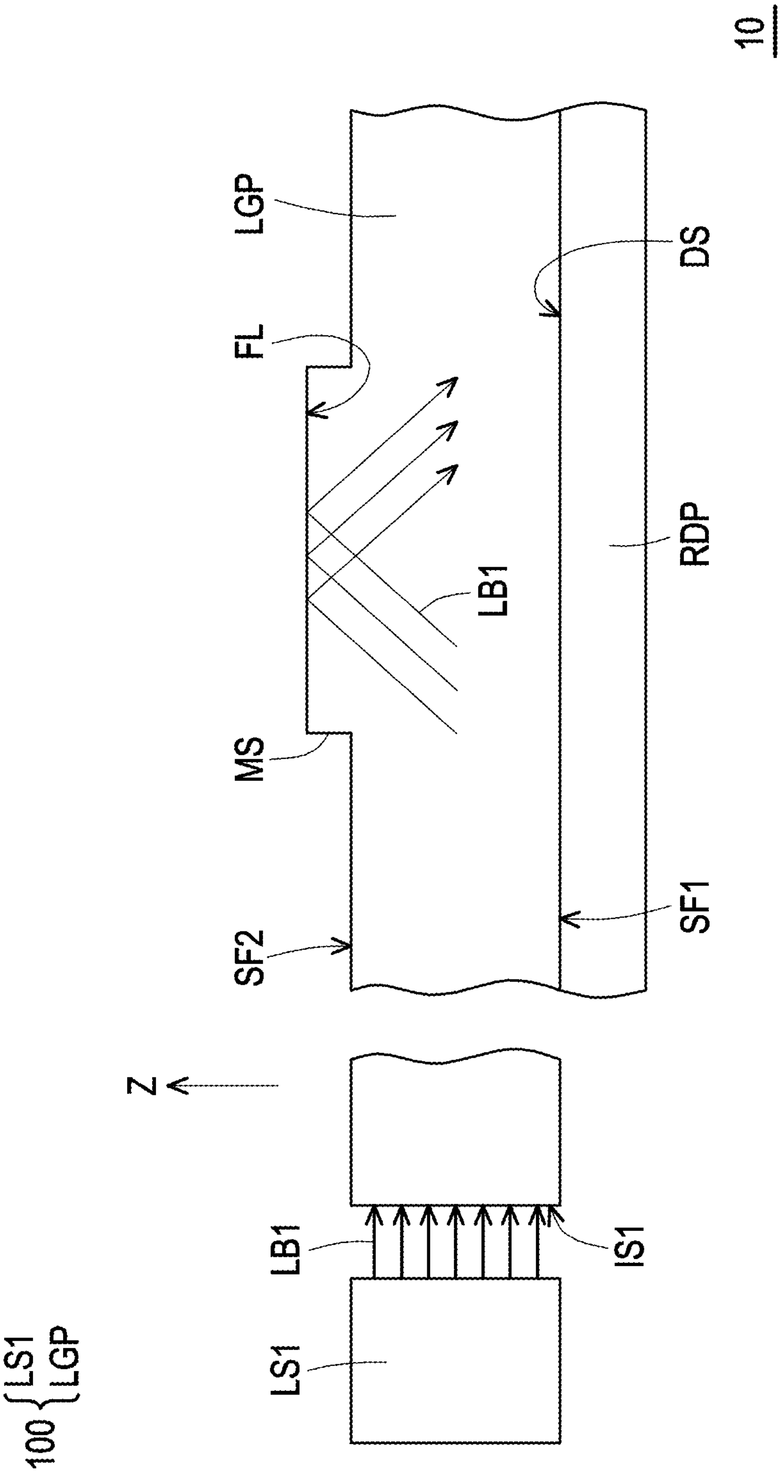
FIG. 2 is a schematic cross-sectional view of a display apparatus adopting the light source module of FIG. 1.
Figure 3:
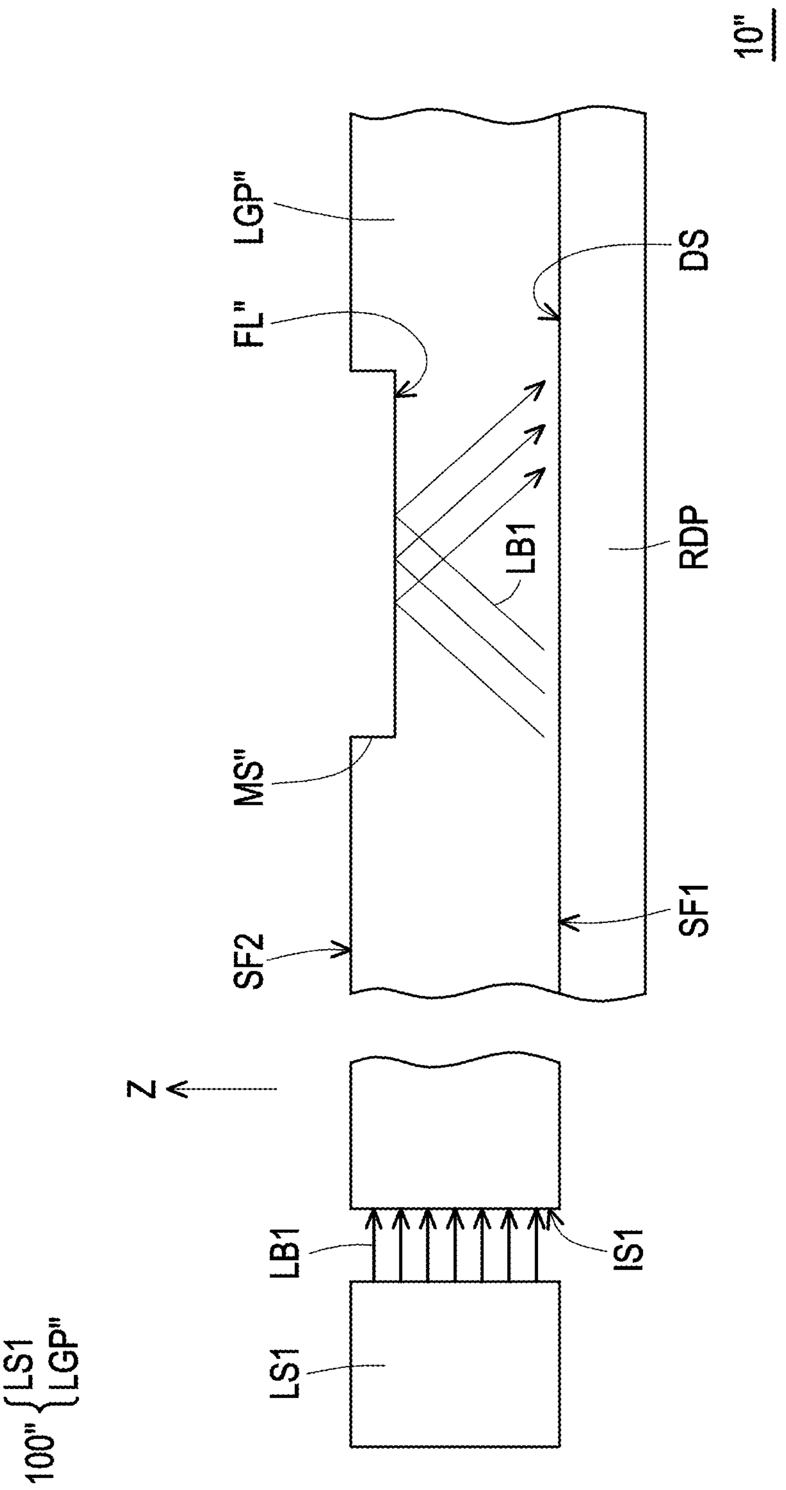
FIG. 3 is a schematic cross-sectional view of another modified embodiment of the display apparatus of FIG. 2.

FIG. 1 is a schematic front view of a light source module according to a first embodiment of the disclosure. FIG. 2 is a schematic cross-sectional view of a display apparatus adopting the light source module of FIG. 1. FIG. 3 is a schematic cross-sectional view of another modified embodiment of the display apparatus of FIG. 2.

Referring to FIGS. 1 and 2, a display apparatus 10 includes a reflective display panel RDP and a light source module 100. The reflective display panel RDP has a display surface DS, and the light source module 100 is disposed on one side of the display surface DS of the reflective display panel RDP. The light source module 100 includes a light guide plate LGP, a first light source LS1 and a plurality of optical microstructures MS. The light guide plate LGP has a first light incident surface IS1, a first surface SF1 and a second surface SF2. The first surface SF1 and the second surface SF2 are connected to the first light incident surface IS1 and are opposite to each other. The first surface SF1 faces the display surface DS of the reflective display panel RDP.

The material of the light guide plate LGP may, for example, include glass, polymethylmethacrylate (PMMA), polycarbonate (PC), or other resin materials with high light transmittance, but the disclosure is not limited thereto. The manufacturing method of the optical microstructures MS may, for example, include injection molding, roll-to-roll embossing, laser engraving, inkjet printing or photolithography process, but the disclosure is not limited thereto.

The first light source LS1 is disposed on one side of the first light incident surface IS1 of the light guide plate LGP, and is configured to emit a plurality of first light beams LB1 toward the first light incident surface IS1 of the light guide plate LGP. For example, the first light source LS1 may be composed of a light bar provided with a plurality of light-emitting elements, but the disclosure is not limited thereto.

The plurality of optical microstructures MS are disposed on the second surface SF2 of the light guide plate LGP. It is particularly noted that each of the optical microstructures MS has a plane FL parallel to the second surface SF2. It should be noted that if the processing tolerance of the light guide plate LGP is considered, the included angle between the plane FL and the second surface SF2 is not exactly 0 degrees but is still sufficiently small, for example, less than 1 degree, such that the plane FL can still be regarded as substantially parallel to the second surface SF2.

In the embodiment, the plane FL of each optical microstructure MS protrudes from the second surface SF2 of the light guide plate LGP along a direction (e.g., direction Z) away from the first surface SF1, but the disclosure is not limited thereto. In the display apparatus 10" of another modified embodiment, the plane FL" of the optical microstructure MS" on the light guide plate LGP" of the light source module 100" may also be recessed from the second surface SF2 along a direction (e.g., a reverse direction of direction Z) toward the first surface SF1 (as shown in FIG. 3).

The plurality of first light beams LB1 transmitted in the light guide plate LGP, after being reflected by the plurality of planes FL of the plurality of optical microstructures MS, exit from the first surface SF1 and illuminate the display surface DS of the reflective display panel RDP. Since the optical surface of the optical microstructure MS of the embodiment used to reflect the first light beam LB1 is the plane FL, the first light beam LB1 may create a more uniform light emission distribution on a surface of the light guide plate LGP facing the reflective display panel RDP after being reflected by the plane FL, especially the light emission uniformity in an area on the side of the first surface SF1 of the light guide plate LGP close to the first light source LS1 is even better than that of the current light guide plate adopting arc-shaped or cone-shaped optical microstructures.

That is, in the embodiment, the optical microstructure MS, using the plane FL as the optical surface, can significantly improve the uneven light emission caused by the light source distribution in the area of the light guide plate LGP close to the first light source LS1, which helps to improve the overall light emission uniformity of the light guide plate LGP on the light emitting surface (i.e., the first surface SF1).

In the embodiment, an included angle A1 between an extension direction ED of each optical microstructure MS and the first light incident surface IS1 of the light guide plate LGP may be equal to 90 degrees, that is, the extension direction ED of the optical microstructure MS may be perpendicular to the first light incident surface IS1 of the light guide plate, but the disclosure is not limited thereto.

In the embodiment, the second surface SF2 of the light guide plate LGP may be provided with a first zone Z1 and a second zone Z2. The second zone Z2 is provided between the first light incident surface IS1 and the first zone Z1. The plurality of optical microstructures MS may include a plurality of first optical microstructures MS1 disposed in the first zone Z1 and a plurality of second optical microstructures MS2 disposed in the second zone Z2. That is, each second optical microstructure MS2 is located between the first optical microstructures MS1 and the first light incident surface IS1.

It is particularly noted that a first length L1 of each of the first optical microstructures MS1 in the extension direction ED may be greater than a second length L2 of each of the second optical microstructures MS2 in the extension direction ED, and the second length L2 of each of the second optical microstructures MS2 gradually decreases as it approaches the first light incident surface IS1 of the light guide plate LGP (as shown in FIG. 1). Through the gradual variation in the length of the aforementioned optical microstructures, the light emission uniformity of the light emitting surface (e.g., the first surface SF1 in FIG. 2) of the light guide plate LGP near the first light source LS1 can be further improved.

In the embodiment, the plurality of optical microstructures MS can be arranged on the second surface SF2 at equal intervals along the direction X and the direction Y respectively. For example, a first spacing S1 of any two adjacent ones of the plurality of first optical microstructures MS1 in the first zone Z1 and arranged along the direction X (i.e., an arrangement direction) is equal to a second spacing S2 of any two adjacent ones of the plurality of second optical microstructures MS2 in the second zone Z2 and arranged along the direction X, but the disclosure is not limited thereto.

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 4:
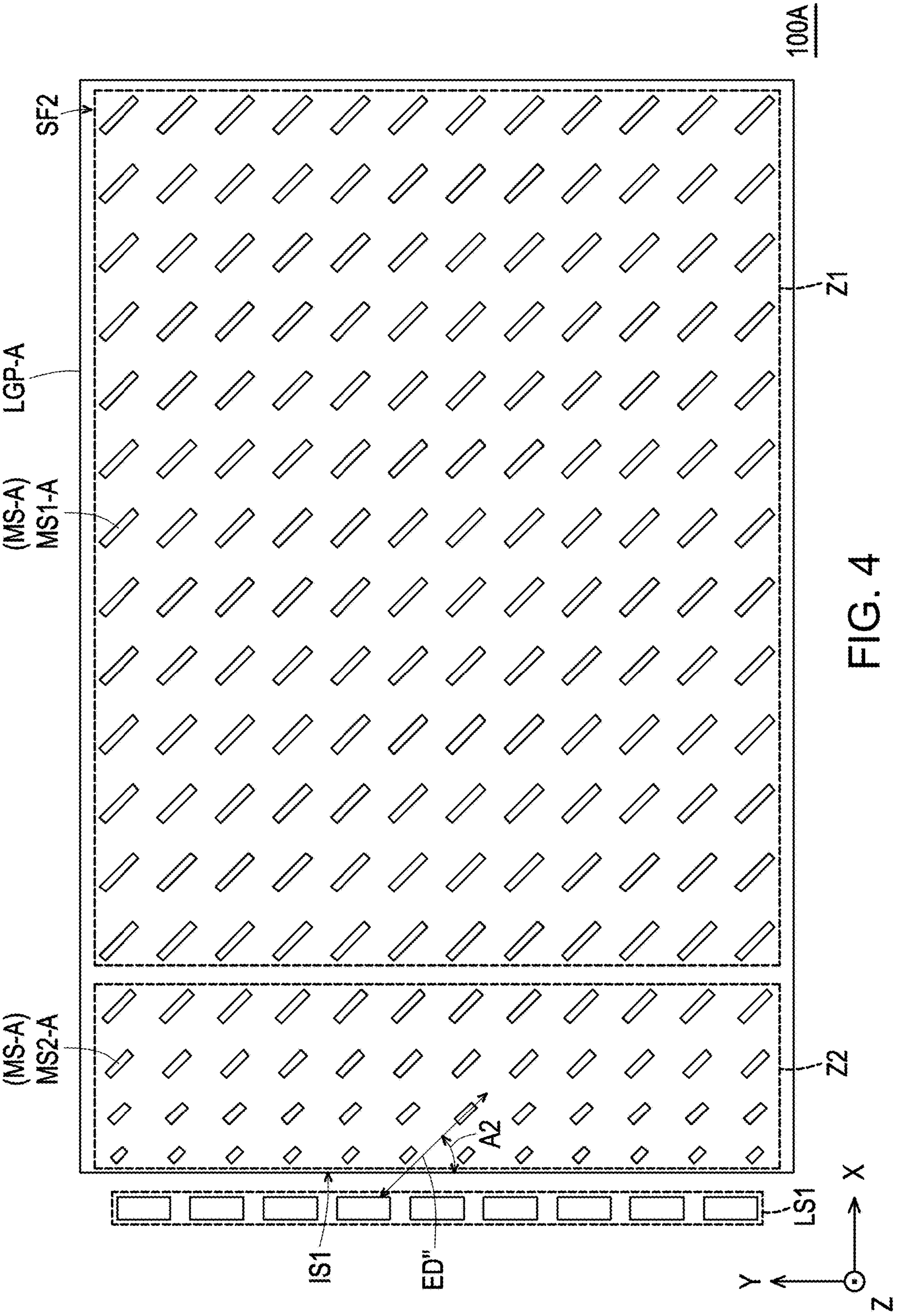
FIG. 4 is a schematic front view of a light source module according to a second embodiment of the disclosure.

FIG. 4 is a schematic front view of a light source module according to a second embodiment of the disclosure. Referring to FIG. 4, the difference between a light source module 100A of the embodiment and the light source module 100 of FIG. 1 lies in that the extension directions of the optical microstructures are different. Specifically, in the light source module 100A of the embodiment, the extension directions ED" of each of the plurality of optical microstructures MS-A of the light guide plate LGP-A may intersect but are not perpendicular to the first light incident surface IS1. For example, an included angle A2 between the extension direction ED" of each of the optical microstructures MS-A (such as the first optical microstructures MS1-A and the second optical microstructures MS2-A) and the first light incident surface IS1 may be greater than or equal to 45 degrees and less than 90 degrees.

It is particularly noted that based on the configuration of the optical microstructure MS in FIG. 1, the optical microstructure MS-A of the embodiment may further optimize the overall light emission uniformity of the light guide plate LGP-A by adjusting the included angle between the extension direction ED" thereof and the first light incident surface IS.

Figure 5:
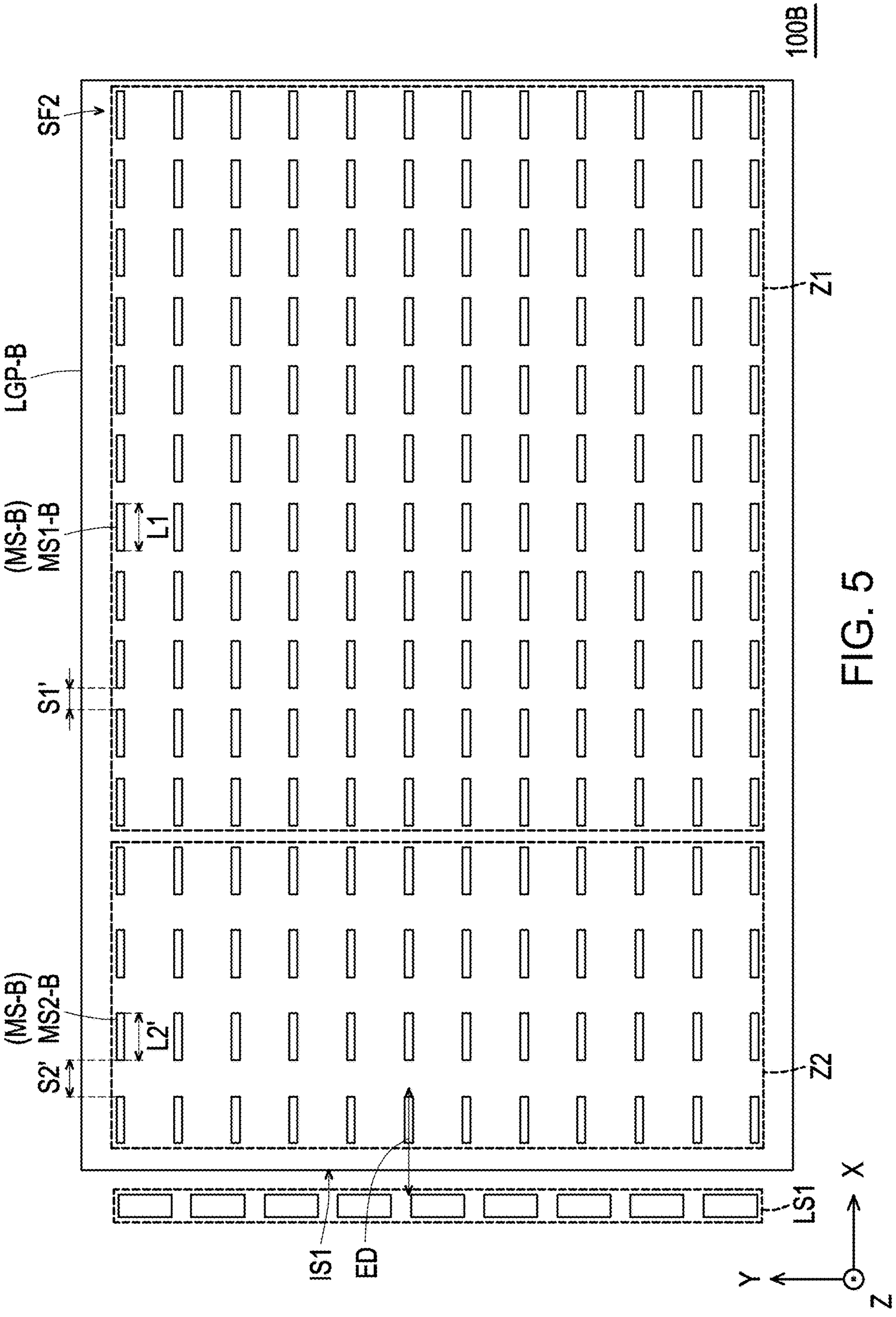
FIG. 5 is a schematic front view of a light source module according to a third embodiment of the disclosure.

FIG. 5 is a schematic front view of a light source module according to a third embodiment of the disclosure. Referring to FIG. 5, the difference between a light source module 100B of the embodiment and the light source module 100 of FIG. 1 lies in that the configuration of the optical microstructure is different. Specifically, in the light source module 100B of the embodiment, the length of each of the plurality of optical microstructures MS-B of the light guide plate LGP-B in the extension direction ED is the same, and the optical microstructures MS-B may be arranged along the direction X (i.e., the arrangement direction) with at least two different spacings.

For example, the first length L1 of each of the plurality of first optical microstructures MS1-B located in the first zone Z1 in the extension direction ED is substantially equal to the second length L2' of each of the plurality of second optical microstructures MS2-B located in the second zone Z2 in the extension direction ED, and the second spacing S2' of any two adjacent ones of the second optical microstructures MS2-B arranged along the direction X is greater than the first spacing S1' of any two adjacent ones of the first optical microstructures MS1-B arranged along the direction X.

That is, in the embodiment, the distribution density of the second optical microstructure MS2-B in the second zone Z2 may be lower than the distribution density of the first optical microstructure MS1-B in the first zone Z1. Accordingly, the light emission uniformity of the light emitting surface (e.g., the first surface SF1 in FIG. 2) of the light guide plate LGP-B in an area (e.g., the second zone Z2) near the first light source LS1 may be further improved.

In particular, the technical approach disclosed in the embodiment, which involves adjusting the distribution density of the optical microstructures MS-B on the second surface SF2, can also be applied to the light guide plate LGP in the embodiment of FIG. 1, in order to further enhance the flexibility of adjusting the light emission distribution of the light guide plate.

Figure 6:
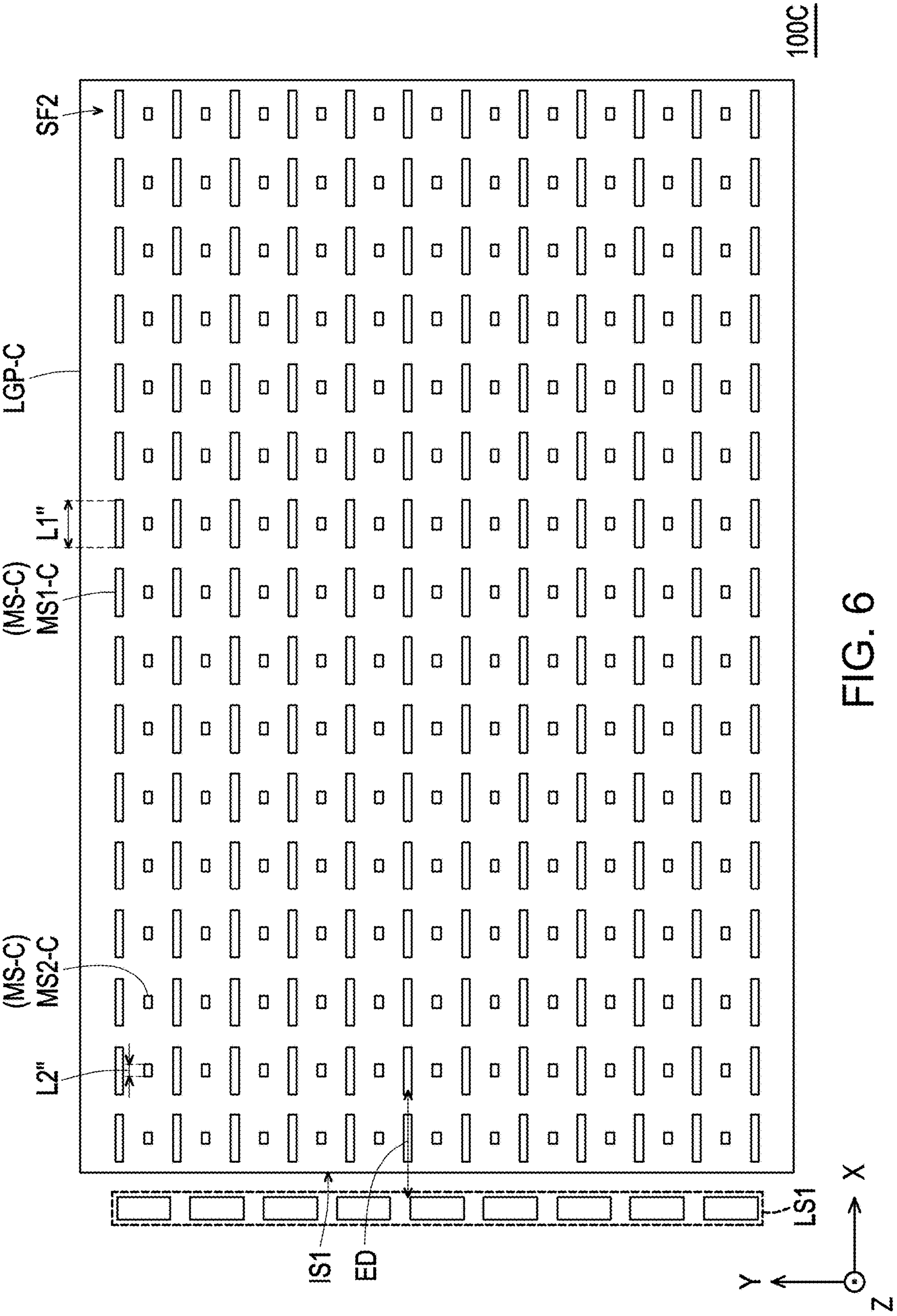
FIG. 6 is a schematic front view of a light source module according to a fourth embodiment of the disclosure.

FIG. 6 is a schematic front view of a light source module according to a fourth embodiment of the disclosure. Referring to FIG. 6, the difference between a light source module 100C of the embodiment and the light source module 100 of FIG. 1 lies in that the configuration of the optical microstructure is different. Specifically, in the light source module 100C of the embodiment, the plurality of optical microstructures MS-C of the light guide plate LGP-C include a plurality of first optical microstructures MS1-C having a first length L1" in the extension direction ED and a plurality of second optical microstructures MS2-C having a second length L2" in the extension direction ED, and the first length L1" may be greater than the second length L2".

It is particularly noted that, in the embodiment, the plurality of first optical microstructures MS1-C and the plurality of second optical microstructures MS2-C can be alternately arranged along the direction Y (i.e., the arrangement direction). More specifically, the first optical microstructures MS1-C can be arranged into a plurality of first structure strings along the direction X, and the second optical microstructures MS2-C can be arranged into a plurality of second structure strings along the direction X. These first structure strings and these second structure strings are alternately arranged along the direction Y. In the embodiment, the arrangement direction (e.g., direction Y) of the first optical microstructures MS1-C and the second optical microstructures MS2-C alternately arranged may intersect (e.g., be perpendicular to) the extension direction ED of the optical microstructure MS-C.

Under the premise that the optical surface of the optical microstructure MS-C is a plane, the design of optical microstructures MS-C with various lengths and their arrangement distribution may further enhance the flexibility of adjusting the light emission distribution of the light guide plate.

Figure 7:
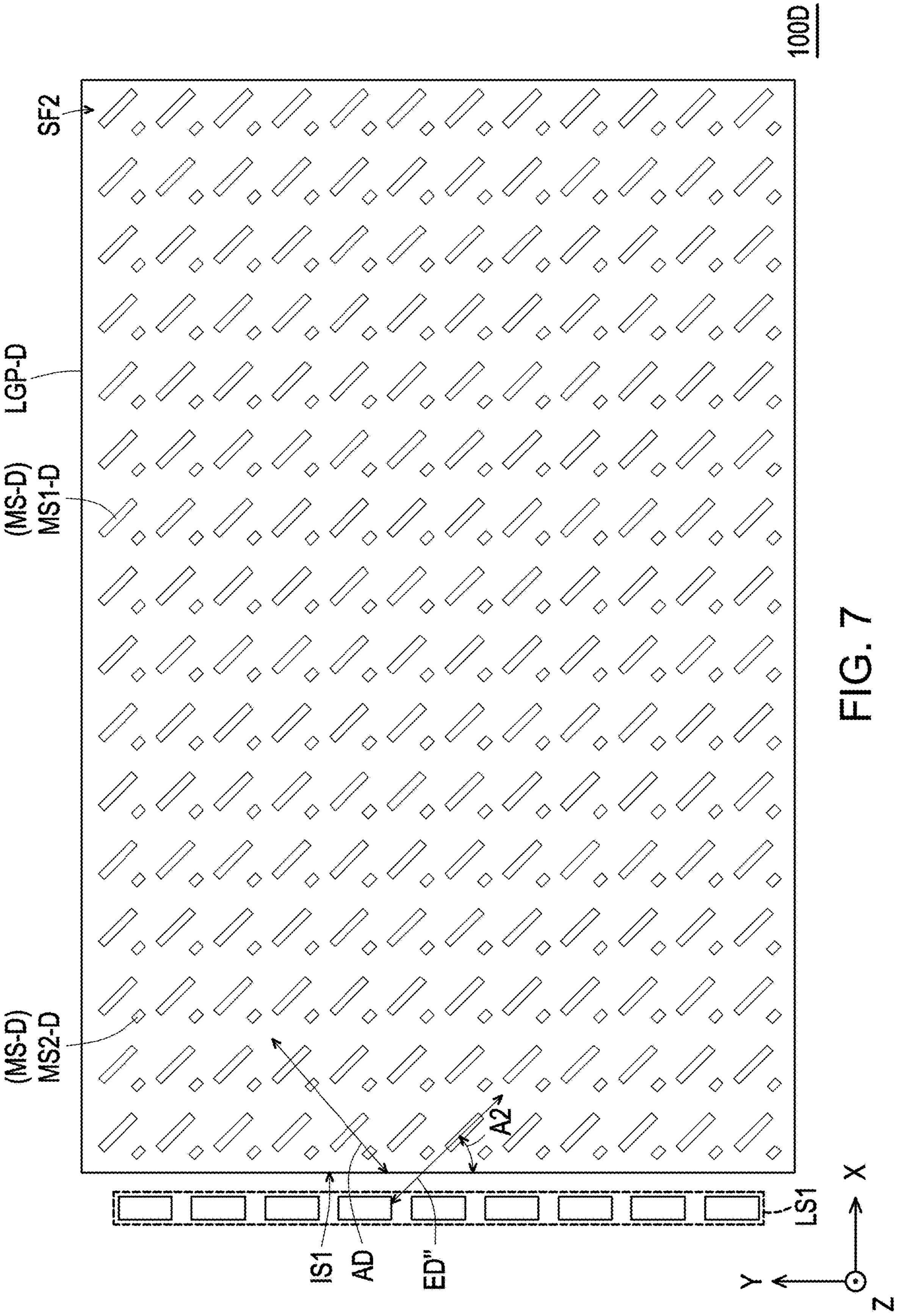
FIG. 7 is a schematic front view of a light source module according to a fifth embodiment of the disclosure.

FIG. 7 is a schematic front view of a light source module according to a fifth embodiment of the disclosure. Referring to FIG. 7, the difference between a light source module 100D of the embodiment and the light source module 100C of FIG. 6 lies in that the extension directions of the optical microstructures are different. Specifically, in the light source module 100D of the embodiment, the extension direction ED" of each of the plurality of optical microstructures MS-D of the light guide plate LGP-D may intersect but is not perpendicular to the first light incident surface IS1. For example, the included angle A2 between the extension direction ED" of each of the optical microstructures MS-D and the first light incident surface IS1 may be greater than or equal to 45 degrees and less than 90 degrees.

From another perspective, in the embodiment, the plurality of first optical microstructures MS1-D and the plurality of second optical microstructures MS2-D are alternately arranged along an arrangement direction AD, and the arrangement direction AD is not parallel to the direction Y and the direction X. For example, the arrangement direction AD in which the first optical microstructures MS1-D and the second optical microstructures MS2-D are alternately arranged may be substantially perpendicular to the extension direction ED" of the optical microstructure MS-D, but the disclosure is not limited thereto.

It is particularly noted that based on the configuration of the optical microstructure MS-C in FIG. 6, the optical microstructure MS-D of the embodiment may further optimize the overall light emission uniformity of the light guide plate LGP-D by adjusting the included angle between the extension direction ED" thereof and the first light incident surface IS1.

Figure 8:
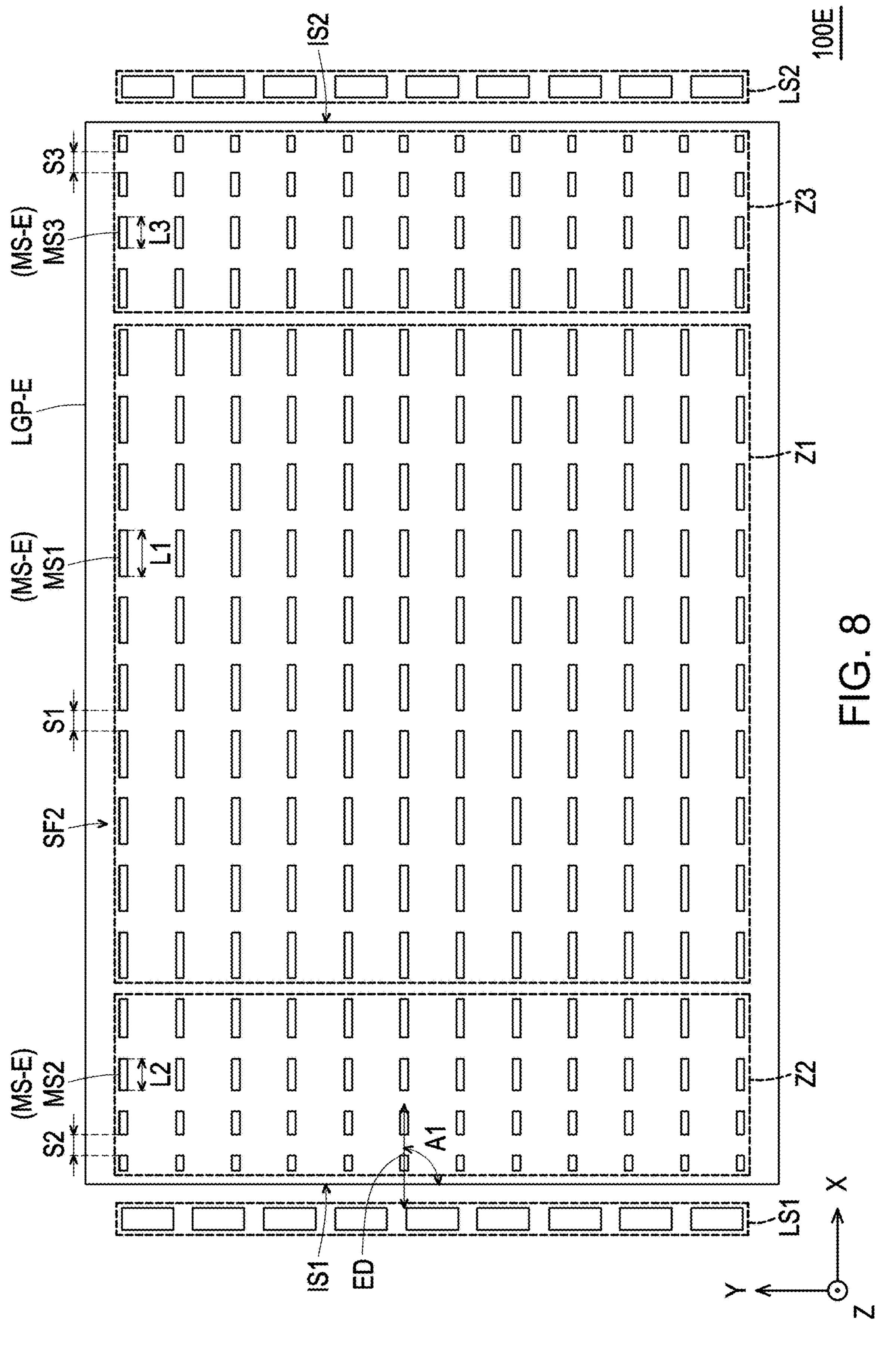
FIG. 8 is a schematic front view of a light source module according to a sixth embodiment of the disclosure.
Figure 9:
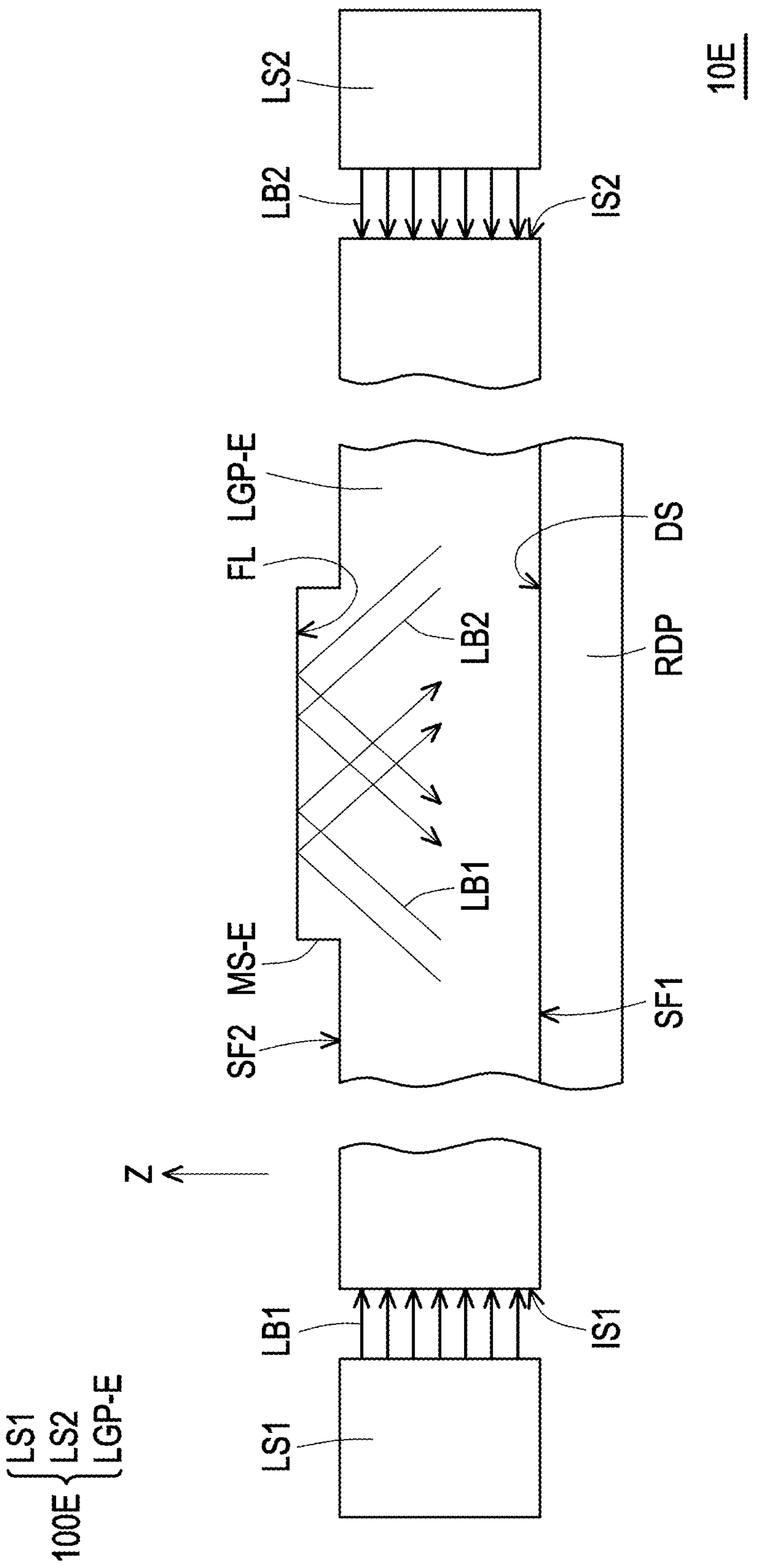
FIG. 9 is a schematic cross-sectional view of a display apparatus adopting the light source module of FIG. 8.

FIG. 8 is a schematic front view of a light source module according to a sixth embodiment of the disclosure. FIG. 9 is a schematic cross-sectional view of a display apparatus adopting the light source module of FIG. 8. Referring to FIG. 8 and FIG. 9, the difference between a display apparatus 10E of the embodiment and the display apparatus 10 of FIG. 2 lies in that the number of light sources of the light source module and the configuration of the optical microstructures are different. Specifically, in the embodiment, the light source module 100E of the display apparatus 10E further includes a second light source LS2. The second light source LS2 is disposed on one side of a second light incident surface IS2 of the light guide plate LGP-E and is configured to emit a plurality of second light beams LB2 toward the second light incident surface IS2 of the light guide plate LGP-E. The second light incident surface IS2 connects the first surface SF1 and the second surface SF2 and is opposite to the first light incident surface IS1. For example, the second light source LS2 may be composed of a light bar provided with a plurality of light-emitting elements, but the disclosure is not limited thereto.

The plurality of first light beams LB1 and the plurality of second light beams LB2 transmitted in the light guide plate LGP-E, after being reflected by the plurality of planes FL of the plurality of optical microstructures MS-E, exit from the first surface SF1 and illuminate the display surface DS of the reflective display panel RDP. Since the optical surface of the optical microstructure MS of the embodiment used to reflect the first beam LB1 and the second beam LB2 is the plane FL, the first beam LB1 and the second beam LB2 may create a more uniform light emission distribution on a surface of the light guide plate LGP-E facing the reflective display panel RDP after being reflected by the plane FL, especially the light emission uniformity in areas on two sides of the first surface SF1 of the light guide plate LGP-E close to the first light source LS1 and the second light source LS2 is even better than that of the current light guide plate adopting arc-shaped or cone-shaped optical microstructures.

That is, in the embodiment, the optical microstructure MS-E, using the plane FL as the optical surface, can significantly improve the uneven light emission caused by the light source distribution in areas on both sides of the light guide plate LGP-E and close to the first light source LS1 and the second light source LS2, which helps to improve the overall light emission uniformity of the light guide plate LGP-E on the light emitting surface (i.e., the first surface SF1).

In the embodiment, the second surface SF2 of the light guide plate LGP may further be provided with a third zone Z3. The third zone Z3 is disposed between the second light incident surface IS2 and the first zone Z1. The plurality of optical microstructures MS-E may further include a plurality of third optical microstructures MS3 disposed in the third zone Z3. That is, each third optical microstructure MS3 is located between the first optical microstructures MS1 and the second light incident surface IS2.

It is particularly noted that the first length L1 of each of the first optical microstructures MS1 in the extension direction ED may be greater than the second length L2 of each of the second optical microstructures MS2 in the extension direction ED and a third length L3 of each of the third optical microstructures in the extension direction ED. The second length L2 of each of the second optical microstructures MS2 gradually decrease as it approaches the first light incident surface IS1 of the light guide plate LGP-E, and the third length L3 of each of the third optical microstructures MS3 gradually decrease as it approaches the second light incident surface IS2 of the light guide plate LGP-E (as shown in FIG. 8). Through the gradual variation in the length of the aforementioned optical microstructures, the light emission uniformity of the light emitting surface (e.g., the first surface SF1 in FIG. 9) of the light guide plate LGP-E near the first light source LS1 and the second light source LS2 (for example, the second zone Z2 and the third zone Z3) may be further improved.

In the embodiment, the plurality of optical microstructures MS-E can be arranged on the second surface SF2 at equal intervals along the direction X and the direction Y respectively. For example, the first spacing S1 of any two adjacent ones of the plurality of first optical microstructures MS1 in the first zone Z1 and arranged along the direction X (i.e., an arrangement direction) is equal to the second spacing S2 of any two adjacent ones of the plurality of second optical microstructures MS2 in the second zone Z2 and arranged along the direction X and a third spacing S3 of any two adjacent ones of the plurality of third optical microstructures MS3 in the third zone Z3 and arranged along the direction X, but the disclosure is not limited thereto.

Figure 10:
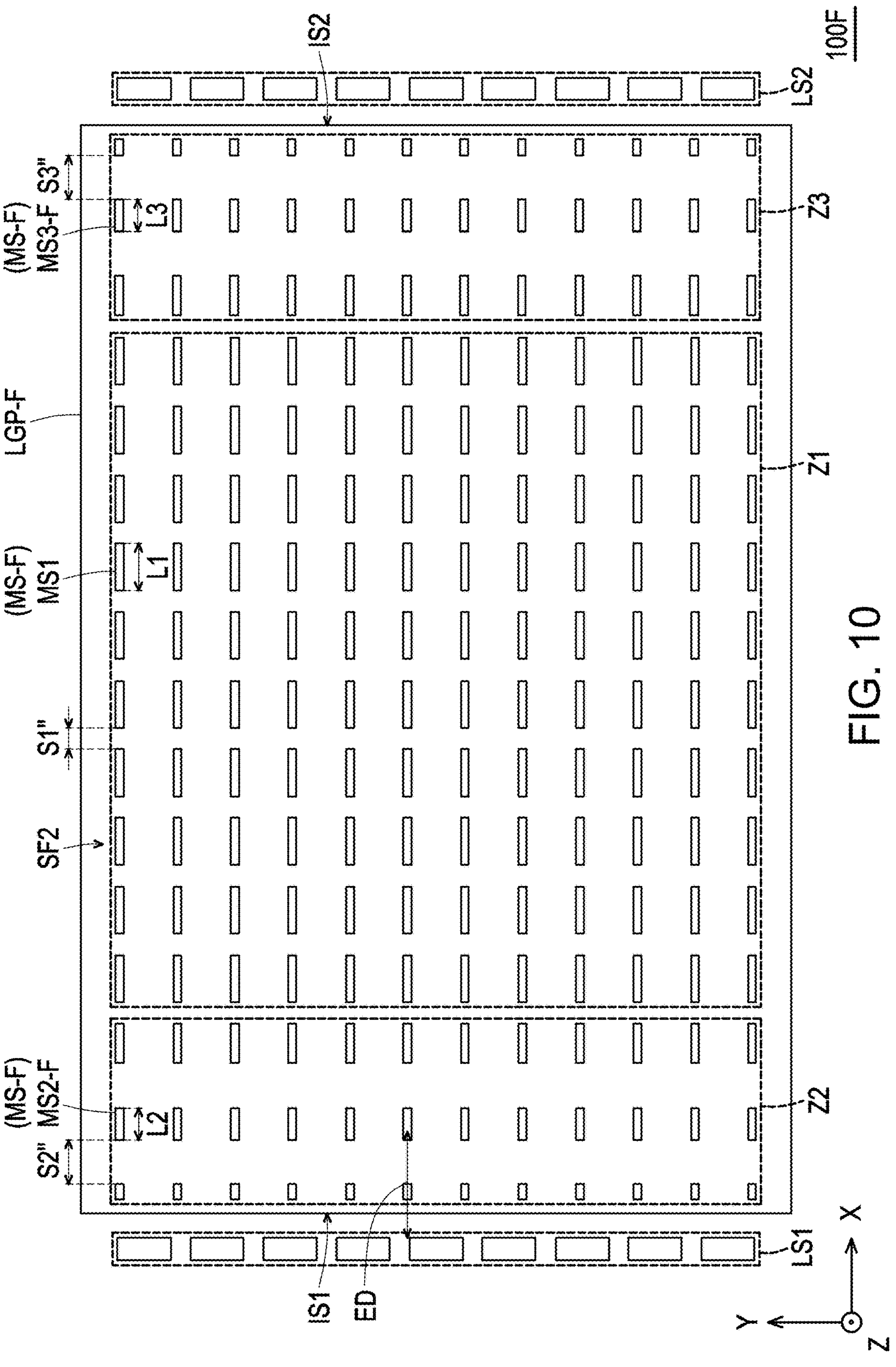
FIG. 10 is a schematic front view of a light source module according to a seventh embodiment of the disclosure.

FIG. 10 is a schematic front view of a light source module according to a seventh embodiment of the disclosure. Referring to FIG. 10, the difference between a light source module 100F of the embodiment and the light source module 100E of FIG. 8 lies in that the configuration of the optical microstructure is different. Specifically, in the light source module 100F of the embodiment, the plurality of optical microstructures MS-F of the light guide plate LGP-F are not all arranged at equal intervals in the direction X.

For example, the second spacing S2" of any two adjacent ones of the plurality of second optical microstructures MS2-F located in the second zone Z2 and arranged along the direction X and the third spacing S3" of any two adjacent ones of the plurality of third optical microstructures MS3-F located in the third zone Z3 and arranged along the direction X are greater than the first spacing S1" of any two adjacent ones of the plurality of first optical microstructures MS1 located in the first zone Z1 and arranged along the direction X.

That is, in the embodiment, the distribution density of the second optical microstructures MS2-F in the second zone Z2 and the distribution density of the third optical microstructures MS3-F in the third zone Z3 may be lower than the distribution density of the first optical microstructures MS1-F in the first zone Z1. Accordingly, the light emission uniformity of the light emitting surface (e.g., the first surface SF1 in FIG. 9) of the light guide plate LGP-F near the first light source LS1 and the second light source LS2 (for example, the second zone Z2 and the third zone Z3) may be further improved.

To sum up, in a display apparatus according to an embodiment of the disclosure, a light guide plate is provided on one side of a display surface of a reflective display panel, and a plurality of optical microstructures are provided on a surface of the light guide plate facing away from the reflective display panel. Since each optical microstructure has a plane substantially parallel to the surface on which it is installed, the light beam transmitted in the light guide plate may create a more uniform light emission distribution on a surface of the light guide plate facing the reflective display panel after being reflected by the plane of the optical microstructure, thereby improving the display quality of the display apparatus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:

a reflective display panel, having a display surface;

a light guide plate, disposed on one side of the display surface of the reflective display panel, and having a first light incident surface and a first surface connected to each other, the first surface faces the display surface of the reflective display panel;

a first light source, disposed on one side of the first light incident surface of the light guide plate, and configured to emit a plurality of first light beams toward the first light incident surface of the light guide plate; and a plurality of optical microstructures, disposed on a second surface of the light guide plate, wherein the second surface connects the first light incident surface and is opposite to the first surface, the plurality of optical microstructures each have a plane, the plane is parallel to the second surface, and an included angle between an extension direction of each of the plurality of optical microstructures and the first light incident surface of the light guide plate is greater than or equal to 45 degrees and less than or equal to 90 degrees, wherein the plurality of optical microstructures include a plurality of first optical microstructures and a plurality of second optical microstructures, each of the plurality of second optical microstructures is located between the plurality of first optical microstructures and the first light incident surface, and a first length of each of the plurality of first optical microstructures in the extension direction is greater than a second length of each of the plurality of second optical microstructures in the extension direction.

2. The display apparatus according to claim 1, wherein the extension direction of each of the plurality of optical microstructures is perpendicular to the first light incident surface of the light guide plate.

3. A display apparatus, comprising:

a reflective display panel, having a display surface;

a light guide plate, disposed on one side of the display surface of the reflective display panel, and having a first light incident surface and a first surface connected to each other, the first surface faces the display surface of the reflective display panel;

a first light source, disposed on one side of the first light incident surface of the light guide plate, and configured to emit a plurality of first light beams toward the first light incident surface of the light guide plate; and a plurality of optical microstructures, disposed on a second surface of the light guide plate. wherein the second surface connects the first light incident surface and is opposite to the first surface, the plurality of optical microstructures each have a plane, the plane is parallel to the second surface, and an included angle between an extension direction of each of the plurality of optical microstructures and the first light incident surface of the light guide plate is greater than or equal to 45 degrees and less than or equal to 90 degrees, wherein the included angle between the extension direction of each of the plurality of optical microstructures and the first light incident surface of the light guide plate is less than 90 degrees.

4. The display apparatus according to claim 1, wherein the second length of each of the plurality of second optical microstructures gradually decreases toward the first light incident surface of the light guide plate.

5. A display apparatus, comprising:

a reflective display panel, having a display surface;

a light guide plate, disposed on one side of the display surface of the reflective display panel, and having a first light incident surface and a first surface connected to each other, the first surface faces the display surface of the reflective display panel;

a first light source, disposed on one side of the first light incident surface of the light guide plate, and configured to emit a plurality of first light beams toward the first light incident surface of the light guide plate; and a plurality of optical microstructures, disposed on a second surface of the light guide plate, wherein the second surface connects the first light incident surface and is opposite to the first surface, the plurality of optical microstructures each have a plane, the plane is parallel to the second surface, and an included angle between an extension direction of each of the plurality of optical microstructures and the first light incident surface of the light guide plate is greater than or equal to 45 degrees and less than or equal to 90 degrees, wherein the plurality of optical microstructures include a plurality of first optical microstructures and a plurality of second optical microstructures arranged along an arrangement direction, each of the plurality of second optical microstructures is located between the plurality of first optical microstructures and the first light incident surface, any two adjacent ones of the plurality of first optical microstructures arranged along the arrangement direction have a first spacing, any two adjacent ones of the plurality of second optical microstructures arranged along the arrangement direction have a second spacing, and the second spacing is greater than the first spacing.

6. A display apparatus, comprising:

a reflective display panel, having a display surface;

a light guide plate, disposed on one side of the display surface of the reflective display panel, and having a first light incident surface and a first surface connected to each other, the first surface faces the display surface of the reflective display panel;

a first light source, disposed on one side of the first light incident surface of the light guide plate, and configured to emit a plurality of first light beams toward the first light incident surface of the light guide plate; and a plurality of optical microstructures, disposed on a second surface of the light guide plate, wherein the second surface connects the first light incident surface and is opposite to the first surface, the plurality of optical microstructures each have a plane, the plane is parallel to the second surface, and an included angle between an extension direction of each of the plurality of optical microstructures and the first light incident surface of the light guide plate is greater than or equal to 45 degrees and less than or equal to 90 degrees, wherein the plurality of optical microstructures include a plurality of first optical microstructures and a plurality of second optical microstructures, the plurality of first optical microstructures and the plurality of second optical microstructures are alternately arranged along an arrangement direction, a first length of each of the plurality of first optical microstructures in the extension direction is greater than a second length of each of the plurality of second optical microstructures in the extension direction, and the arrangement direction intersects the extension direction.

7. The display apparatus according to claim 1, wherein the plane of each of the plurality of optical microstructures is protruded from the second surface along a direction away from the first surface, or recessed from the second surface along a direction toward the first surface.

8. The display apparatus according to claim 1, further comprising:

a second light source, disposed on one side of a second light incident surface of the light guide plate, and configured to emit a plurality of second light beams toward the second light incident surface of the light guide plate, the second light incident surface connects the first surface and the second surface and is opposite to the first light incident surface, wherein the plurality of optical microstructures include a plurality of first optical microstructures, a plurality of second optical microstructures and a plurality of third optical microstructures, each of the plurality of second optical microstructures is located between the plurality of first optical microstructures and the first light incident surface, each of the plurality of third optical microstructures is located between the plurality of first optical microstructures and the second light incident surface, a first length of each of the plurality of first optical microstructures in the extension direction is greater than a second length of each of the plurality of second optical microstructures in the extension direction and a third length of each of the plurality of third optical microstructures in the extension direction.

9. The display apparatus according to claim 8, wherein the plurality of optical microstructures are arranged along an arrangement direction, any two adjacent ones of the plurality of first optical microstructures arranged along the arrangement direction have a first spacing, any two adjacent ones of the plurality of second optical microstructures arranged along the arrangement direction have a second spacing, any two adjacent ones of the plurality of third optical microstructures arranged along the arrangement direction have a third spacing, and the second spacing and the third spacing are greater than the first spacing.

* * * * *